United States Patent
Zhao et al.

(10) Patent No.: US 11,283,908 B1
(45) Date of Patent: Mar. 22, 2022

(54) COMMUNICATION DEVICE HAVING A CONFIGURABLE HOUSING WITH MULTIPLE ANTENNAS

(71) Applicant: MOTOROLA MOBILITY LLC, Chicago, IL (US)

(72) Inventors: Junsheng Zhao, Vernon Hills, IL (US); Mohammed R. Abdul-Gaffoor, Palatine, IL (US); Md Faisal Abedin, Lisle, IL (US); Md Rashidul Islam, Glen Ellyn, IL (US); Kasra Ghaemi, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/170,356

(22) Filed: Feb. 8, 2021

(51) Int. Cl.
| | |
|---|---|
| *H01Q 1/52* | (2006.01) |
| *H01Q 1/22* | (2006.01) |
| *H04M 1/02* | (2006.01) |
| *H04W 88/06* | (2009.01) |
| *H01Q 5/25* | (2015.01) |
| *H01Q 1/24* | (2006.01) |
| *H01Q 5/50* | (2015.01) |

(52) U.S. Cl.
CPC .......... *H04M 1/0216* (2013.01); *H01Q 1/242* (2013.01); *H01Q 1/523* (2013.01); *H01Q 5/25* (2015.01); *H04W 88/06* (2013.01); *H01Q 5/50* (2015.01)

(58) Field of Classification Search
CPC .... H04M 1/02; H04M 1/0202; H04M 1/0216; H04W 88/06; H01Q 1/22; H01Q 1/24; H01Q 1/242; H01Q 1/52; H01Q 1/521; H01Q 1/523
See application file for complete search history.

(56) References Cited

U.S. PATENT DOCUMENTS

| | | | |
|---|---|---|---|
| 7,444,175 B2 * | 10/2008 | Ito .......................... | H01Q 21/28 455/425 |
| 8,849,217 B2 | 9/2014 | Rousu et al. | |
| 9,391,762 B2 | 7/2016 | Rousu | |
| 10,554,243 B2 | 2/2020 | Bai | |
| 10,587,329 B2 | 3/2020 | Maldonado et al. | |
| 10,972,145 B1 * | 4/2021 | Klomsdorf ............ | H01Q 1/245 |
| 11,115,510 B1 * | 9/2021 | Abdul-Gaffoor ... | H04M 1/0245 |

(Continued)

*Primary Examiner* — Blane J Jackson
(74) *Attorney, Agent, or Firm* — Isidore PLLC (57) ABSTRACT

A communication device, method and computer program product enable multiple transceiver communication in a communication device having a configurable housing. A pivot mechanism is connected between first and second housing portions for relative movement of a housing assembly between open and closed positions. The closed position aligns four antenna positions in the first housing portion adjacent to one of four antenna positions in the second housing portion to present four pairings of adjacent antenna positions. Four antennas are positioned within the first housing portion or the second housing portion at a different one of the four pairings of adjacent antenna positions. A radio frequency (RF) front end is communicatively coupled to the four antennas and has two or more transceivers that utilize the four antennas to communicate without antenna-to-antenna signal cancellation in RF low band while the housing assembly is in either of the open position and the closed position.

18 Claims, 7 Drawing Sheets

(56) References Cited

U.S. PATENT DOCUMENTS

| | | | |
|---|---|---|---|
| 11,115,511 B1* | 9/2021 | Ghaemi | H01Q 1/243 |
| 2008/0068271 A1* | 3/2008 | Iwai | H01Q 3/2617 |
| | | | 343/702 |
| 2011/0014879 A1* | 1/2011 | Alberth | H01Q 1/242 |
| | | | 455/75 |
| 2017/0229760 A1* | 8/2017 | Karilainen | H01Q 13/10 |
| 2019/0103656 A1 | 4/2019 | Shi et al. | |
| 2020/0076488 A1* | 3/2020 | Brunel | H04B 7/043 |
| 2020/0195336 A1* | 6/2020 | Raghavan | H04B 7/0417 |

\* cited by examiner

COMMUNICATION DEVICE HAVING A CONFIGURABLE HOUSING WITH MULTIPLE ANTENNAS

TECHNICAL FIELD

The present disclosure relates generally to communication devices having multiple antennas that support simultaneous communication channels, and more particularly to communication devices having multiple antennas that support simultaneous communication channels within a configurable housing assembly.

DESCRIPTION OF THE RELATED ART

Recent designs of communication devices incorporate an increased number of antennas and antenna arrays for spatial diversity, carrier aggregation, dual connectivity, and directional antenna gain via multiple input multiple output (MIMO) operations. Generally-known communication devices having a flip form factor can have degraded antenna performance in certain RF bands when a configurable housing of the communication device is folded or closed. During folding or closing, components in one movable portion of the communication device are brought close to components in the other portion of the communication device, changing antenna performance for certain antennas or antenna arrays. Conventionally, communication devices having a "candy bar" form factor that do not fold or close have an antenna architecture that spaces antennas around a periphery of a housing. Communication devices having a flip form factor ("flip phone") are generally smaller with insufficient places to put antennas for antenna isolation when closed. In the closed position, the flip phones lose functionality for simultaneous communication by multiple transceivers.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a communication device, a computer program product, and a method enable multiple transceivers to communicate via multiple arrangements of antennas supported by a configurable housing assembly. The housing assembly has first and second housing portions connected at respective proximal sides for relative movement between an open position and a closed position about a lateral axis. Each of the first and the second housing portions has a distal side opposite to the proximal side, and a first lateral side and a second lateral side extending between the respective proximal side and the distal side. As compared to communication devices having a "candy bar" form factor, the configurable housing assembly enables folding of the communication device into a smaller shape for stowing. In addition, the configurable housing assembly can physically protect a display device when the housing assembly is in the closed position. Manually changing the position of the configurable housing assembly from a closed position to an open or partially open position can trigger an application to operate in an open mode. As an example, the communication device can activate a user interface on an inside display of the first and/or second housing portions that is otherwise hidden while the housing assembly is in the closed position. In response to determining that the housing assembly is in the closed position, a controller of the communication device can trigger the application to operate in a closed mode. As an example, the controller can deactivate a user interface device of at least one application of the communication device or switch to an external display while the application remains operating with the housing in the closed position.

In one or more embodiments, a communication device includes a housing assembly and an RF front end. The housing assembly includes a first housing portion and a second housing portion each having a respective distal side opposite to a respective proximal side and a first lateral side and a second lateral side extending between the respective proximal side and the respective distal side. A pivot mechanism is connected between respective proximal sides of the first and the second housing portions for relative movement of the housing assembly between an open position and a closed position. The closed position aligns each of four first housing antenna positions in the first housing portion adjacent to a respective one of four second housing antenna positions in the second housing portion to present four pairings of adjacent antenna positions. Four antennas are each configured to communicate in at least a radio frequency (RF) low band. Each antenna is positioned within a respective one of the first housing portion and the second housing portion at a different one of the four pairings of adjacent antenna positions to prevent antenna-to-antenna signal cancellations. The RF front end is communicatively coupled to the four antennas. The RF front end has two or more transceivers that utilize the four antennas to communicate, without antenna-to-antenna signal cancellation, in RF low band while the housing assembly is in either of the open position and the closed position.

According to one aspect, a method includes providing a housing assembly with a first housing portion and a second housing portion, each having four (4) antenna positions that pairs with an adjacent antenna position when the housing assembly is placed in the closed position. The method includes providing four antennas, each configured to communicate in at least the RF low band. The method includes positioning each antenna at an antenna position in one of the first housing portion and the second housing portion, each antenna positioned at a different one of the four pairings of adjacent antenna positions. The positioning prevents antenna-to-antenna signal cancellations that would otherwise occur between a respective pair of the antenna positions. The method includes connecting respective proximal sides of the first and the second housing portions with a pivot mechanism and extending a power and communication interconnect interconnecting respective printed circuit boards (PCBs) within each of the first and second housing portions. The pivot mechanism enables relative movement between an open position and a closed position that aligns four upper antenna positions on the first housing portion paired respectively with four antenna positions on the second housing portion.

In one or more embodiments, a method includes monitoring a housing position sensor within a housing assembly of a communication device. The sensor detects: (i) when the housing assembly is in a closed position; and (ii) when the housing assembly is in an at least partially open position. The method includes triggering, by a controller of the communication device, an application executed by the controller in response to determining that the housing assembly has changed from a closed position to an at least partially open position. The method includes communicating, by first, second, third, and fourth transceiver channels of an RF front end of the communication device, respectively with each of a first, second, third, and fourth antenna in at least LB, while the housing assembly is in either the open position or the closed position, respectively. Each of the first, the second, the third, and the fourth antenna is positioned to avoid antenna-to-antenna signal cancellation while the housing assembly is in either of the open position and the closed position.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. As an example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. As an example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
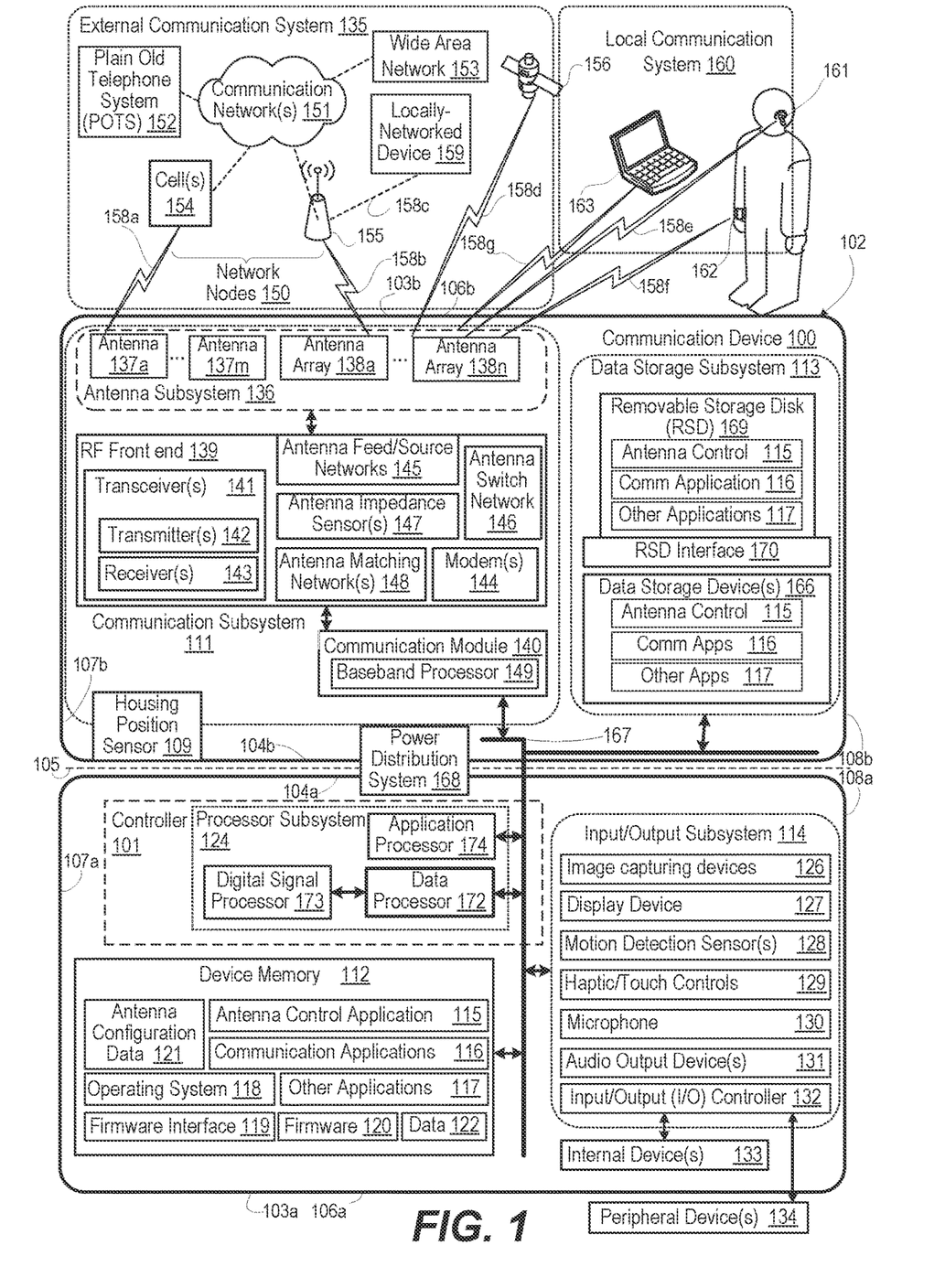
FIG. 1 depicts a functional block diagram of a communication device with multiple antennas operating in a communication environment and within which the features of the present disclosure are advantageously implemented, according to one or more embodiments.

FIG. 1 is a functional block diagram of an electronic device, and more particularly communication device 100, having multiple antennas that are managed by controller 101, in an operating environment within which the features of the present disclosure are advantageously implemented. According to one aspect, communication device 100 includes housing assembly 102. Housing assembly 102 is configurable by having first and second housing portions 103*a*-103*b* connected at respective first and second proximal sides 104*a*-104*b* enabling relative movement between an open position and a closed position about lateral axis 105. Each of first and the second housing portions 103*a*-103*b* has respective distal side 106*a*-106*b*, opposite to proximal side 104a-104b. First lateral side 107a and second lateral side 108a extend between proximal side 104a and distal side 106a of first housing portion 103a. First lateral side 107b and second lateral side 108b extend between proximal side 104b and distal side 106b of second housing portion 103b. Communication device 100 includes housing position sensor 109 and communication subsystem 111. Controller 101 is communicatively coupled to housing position sensor 109, which detects when housing assembly 102 is in: (i) a closed position; and (ii) at least a partially open position or a fully open position. Controller 101 configures communication subsystem 111 to operate based at least in part on the position of housing assembly 102. Housing position sensor 109 can be one of: (i) a two-position binary switch which detects the closed position and any other position considered a partially open position (i.e., not a closed position); (ii) a multiple position switch of discrete values; or (iii) a continuous range sensor. With each implementation, housing position sensor 109 detects the partially open position based on the two housing portions being a predetermined distance or number of degrees apart from each other (e.g., at 30° or 45°). The distance or number of degrees can be empirically determined to correspond with when the antennas are sufficiently apart from each other to not cause antenna-to-antenna transmission interference.

Communication device 100 can be one of a host of different types of devices, including but not limited to, a mobile cellular phone, satellite phone, or smart-phone, a laptop, a net-book, an ultra-book, a networked smart watch, or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring again to FIG. 1, communication device 100 includes communication subsystem 111, device memory 112, data storage subsystem 113, and input/output (I/O) subsystem 114. Device memory 112 and each subsystem (111, 113, and 114) are managed by controller 101. Device memory 112 includes program code and applications such as antenna control application 115, communication applications 116, and other application(s) 117 that use communication services. Device memory 112 further includes operating system (OS) 118, firmware interface 119, such as basic input/output system (BIOS) or Uniform Extensible Firmware Interface (UEFI), and firmware 120. Device memory 112 includes antenna configuration data 121 or other computer data 122 used by antenna control application 115. As an example, antenna configuration data 121 can include antenna assignments to a particular transceiver communication channel based on operating contexts. As an example, context can be MIMO antenna control for increased antenna gain. As another example, the context can be supporting execution of one or more applications. Particular applications can have particular rates of transmitting and receiving data with specific data latency requirements that dictate particular prioritization of communication connections. As an additional example, context can be based at least in part on power consumption and device thermal management that limit communication channels.

Processor subsystem 124 of controller 101 executes program code to provide operating functionality of communication device 100. The software and/or firmware modules have varying functionality when their corresponding program code is executed by processor subsystem 124 or secondary processing devices within communication device 100. According to one embodiment, processor subsystem 124 of controller 101 executes program code of antenna control application 115 to configure communication subsystem 111.

I/O subsystem 114 includes image capturing device(s) 126. I/O subsystem 114 includes user interface devices such as display device 127, motion detection sensors 128, touch/haptic controls 129, microphone 130, and audio output device(s) 131. I/O subsystem 114 also includes I/O controller 132. In one or more embodiments, motion detection sensors 128 can detect an orientation and movement of the communication device 100 that indicates that the communication device 100 should activate display device 127 or should vertically reorient visual content presented on display device 127. In one or more embodiments, motion detection sensors 128 are used for functions other than user inputs, such as detecting an impending ground impact. I/O controller 132 connects to internal devices 133, which are internal to housing assembly 102, and to peripheral devices 134, such as external speakers, which are external to housing assembly 102 of communication device 100. Examples of internal devices 133 are the computing, storage, communication, or sensing components depicted within housing assembly 102. I/O controller 132 supports the necessary configuration of connectors, electrical power, communication protocols, and data buffering to act as an interface for internal devices 133 and peripheral devices 134 to other components of communication device 100 that use a different configuration for inputs and outputs.

Communication subsystem 111 of communication device 100 enables wireless communication with external communication system 135. Communication subsystem 111 includes antenna subsystem 136 having lower band antennas 137a-137m and higher band antenna array modules 138a-138n that can be attached in/at different portions of housing assembly 102. Increasingly, communication devices, such as smartphones, incorporate a number of antennas to support multiple frequency bands assigned to various types of communication networks. Multiple radio frequency (RF) bands, including ultra-low band (UL), low band (LB), mid-band (MB), high band (HB), and ultra-high band (UHB), are supported by the various antennas within the communication devices. Particular public land mobile network (PLMN) and radio access technology (RAT) combinations, as well as services based on 802.11 wireless and global positioning system (GPS) signals, can use one or more of these RF bands.

Communication subsystem 111 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 111 includes baseband processor 149 that communicates with controller 101 and RF front end 139. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedances of transceivers 141. Antenna matching network(s) 148 can also be used to detune the impedance of a particular one of lower band antennas 137a-137m to not match the impedance of transceivers 141 in order to electromagnetically isolate the particular one of lower band antennas 137a-137m.

In one or more embodiments, controller 101, via communication subsystem 111, performs multiple types of over-the-air (OTA) communication with network nodes 150 of external communication system 135. Each of network nodes 150 can be part of a particular one of communication networks 151. One or more communication networks 151 can be public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cells 154 such as provided by base stations or base nodes that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. Multiple radio frequency (RF) bands are used to support these RATs. The RF bands include ultra-low band (UL), low band (LB), mid-band (MB), high band (HB), and ultra-high band (UHB).

In one or more embodiments, network nodes 150 can be access node(s) 155 that support wireless OTA communication. Communication subsystem 111 can receive OTA communication from location services such as provided by global positioning system (GPS) satellites 156. Communication subsystem 111 receives downlink broadcast channel(s) 158d from GPS satellites 156 to obtain geospatial location information. Communication subsystem 111 communicates via OTA communication channel(s) 158a with cells 154. Communication subsystem 111 communicates via wireless communication channel(s) 158b with access node 155. In one or more particular embodiments, access nodes 155 support communication using one or more IEEE 802.11 wireless local area network (WLAN) protocols. Wi-Fi is a family of wireless network protocols, based on the IEEE 802.11 family of standards, which are commonly used for local area networking between user devices and network devices that provide access to the Internet. In one or more particular embodiments, communication subsystem 111 communicates with one or more locally networked devices 159 via wired or wireless link 158c provided by access node 155.

In one or more embodiments, controller 101, via communication subsystem 111, performs multiple types of OTA communication with local communication system 160. In one or more embodiments, local communication system 160 includes wireless headset 161 and smart watch 162 that are coupled to communication device 100 to form a personal access network (PAN). Communication subsystem 111 communicates via low power wireless communication channel(s) 158e with headset 161. Communication subsystem 111 communicates via second low power wireless communication channel(s) 158f, such as Bluetooth, with smart watch 162. In one or more particular embodiments, communication subsystem 111 communicates with other communication device(s) 163 via wireless link 158g to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. As an example, data storage subsystem 113 can provide a selection of program code and applications such as antenna control application 115, location service applications 116, and other application(s) 117 that use communication services. These applications can be loaded into device memory 112 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as antenna control application 115 and other applications 117. When executed by controller 101, the program code causes or configures communication device 100 to provide the multi-transceiver operational functionality using configurable housing assembly 102 described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. Controller 101 can include one or more application processor(s) 174 to monitor sensors or controls such as housing position sensor 109 and antenna switch network 146. In one or more embodiments that are not depicted, controller 101 can further include distributed processing and control components that are peripheral or remote to housing assembly 102 or grouped with other components, such as I/O subsystem 114. Data processor 172 is communicatively coupled, via system interlink 167, to device memory 112. In one or more embodiments, controller 101 of communication device 100 is communicatively coupled via system interlink 167 to communication subsystem 111, data storage subsystem 113, and input/output subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1, it is to be understood that more, fewer, or different interconnections may be present in other embodiments. Interlink 167 communicatively connects components in first housing portion 103a to components in second housing portion 103b. Power distribution subsystem 168 provides electrical power to components in first housing portion 103a and components in second housing portion 103b.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. As an example, communication device 100 may use special purpose hardware, dedicated processors, general purpose computers, microprocessor-based computers, micro-controllers, optical computers, analog computers, dedicated processors and/or dedicated hard-wired logic.

Figure 2A:
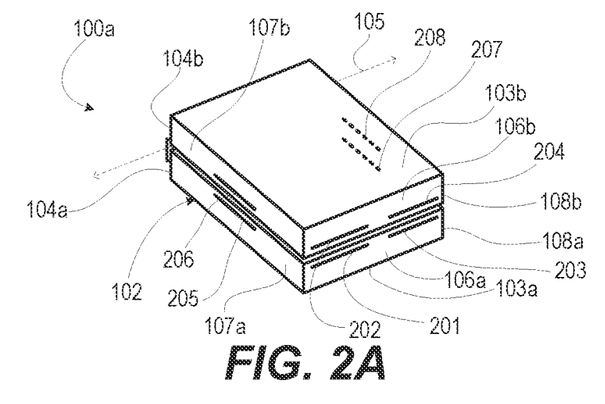
FIG. 2A depicts a three-dimensional view of an example communication device having multiple antennas within a configurable housing assembly in a closed position, according to one or more embodiments.
Figure 2B:
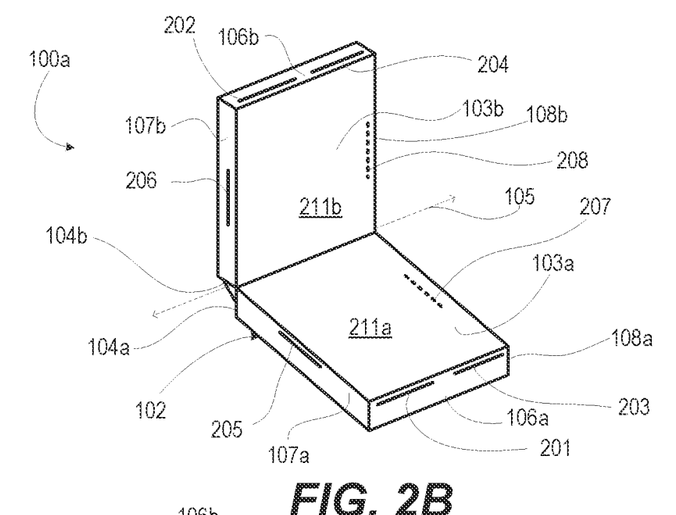
FIG. 2B depicts a three-dimensional view of the example communication device of FIG. 2A having the configurable housing assembly in a partially open position, according to one or more embodiments.
Figure 2C:
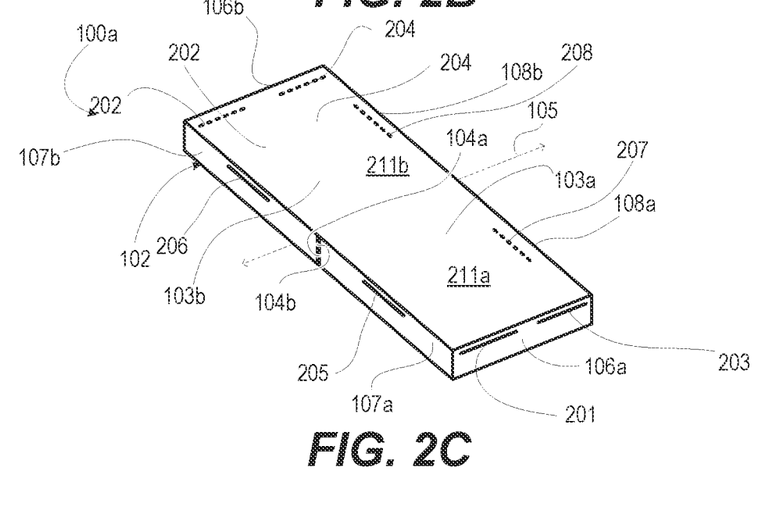
FIG. 2C depicts a three-dimensional view of the example communication device of FIG. 2A having the configurable housing assembly in a fully open position, according to one or more embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100). FIG. 2A depicts a three-dimensional example of communication device 100a having housing assembly 102 configured in a closed position. Communication device 100a can have similar or identical components and functionality of communication device 100 (FIG. 1). FIG. 2B depicts a three-dimensional view of example communication device 100a having housing assembly 102 configured in a partially open position. Housing position sensor 109 (FIG. 1) can detect a particular amount of pivoting from the closed position to the partially open position that is sufficient for a change in an operational characteristic of communication device 100a. Housing position sensor 109 can be one of: (i) a two position binary switch which detects the closed position and any other position considered partially open position (i.e., not a closed position); (ii) a multiple position switch of discrete values; or (iii) a continuous range sensor. The partially open position can be sufficient for viewing display device 127 (FIG. 1), prompting controller 101 (FIG. 1) to activate display device 127 (FIG. 1). FIG. 2C depicts a three-dimensional view of example communication device 100a having housing assembly 102 configured in a fully open position.

In FIGS. 2A-2C, communication device 100a includes housing assembly 102 that is configurable by having first and second housing portions 103a-103b. First and second housing portions 103a-103b are connected at respective first and second proximal sides 104a-104b for relative movement between an open position and a closed position about lateral axis 105. Each of first and the second housing portions 103a-103b has respective distal side 106a/106b opposite to proximal side 104a/104b. First lateral side 107a and second lateral side 108a extend between proximal side 104a and distal side 106a of first housing portion 103a. First lateral side 107b and second lateral side 108b extend between proximal side 104b and distal side 106b of second housing portion 103b. In one embodiment, first housing portion 103a is a base housing. Second housing portion 103b is a flip housing. First lateral sides 107a-107b are on the left. Second lateral sides 108a-108b are on the right.

According to one aspect, housing assembly 102 includes a plurality of possible antenna mounting locations, illustrated as antenna mounting locations 201-208. First antenna mounting location 201 is a left section of distal side 106a of first housing portion 103a. Second antenna mounting location 202 is a left section of distal side 106b of second housing portion 103b. Third antenna mounting location 203 is a right section of distal side 106a of first housing portion 103a. Fourth antenna mounting location 204 is a right section of distal side 106b of second housing portion 103b. Fifth antenna mounting location 205 is on left lateral side 107a of first housing portion 103a. Sixth antenna mounting location 206 is on left lateral side 107b of second housing portion 103b. Seventh antenna mounting location 207 is on right lateral side 108a of first housing portion 103a. Eighth antenna mounting location 208 on right lateral side 108b of second housing portion 103b. While housing assembly 102 is in the closed position of FIG. 2A, specific pairs of antenna mounting locations 201-208 are aligned proximate to each other across the base and flip housing. These aligned pairs include: (i) first and second antenna mounting locations 201-202; (ii) third and fourth antenna mounting locations 203-204; (iii) fifth and sixth antenna mounting locations 205-206; and (iv) seventh and eight antenna mounting locations 207-208. While housing assembly 102 is in the closed position, the close proximity of the antenna locations in each pair impairs antenna efficiency. The present disclosure avoids putting two of antennas 137a-137d (FIG. 1) in the same pair of antenna mounting locations 201-208, enabling communication in the low bands in either of the open and closed positions of housing assembly 102. At a partially open position of housing assembly 102 in FIG. 2B, separation between first and second housing portions 103a-103b is sufficient for viewing front surfaces 211a-211b respectively of first and second housing portions 103a-103b. The at least partially open position of housing assembly 102 can be one or more positions greater than 0° and less than 180° defined as pivot angles between first and second housing portions 103a-103b. As an example, the defined pivot angles can be based on one or more considerations such as: (i) capabilities of housing position sensor 109 (FIG. 1); (ii) mechanically available positions of housing position 102; (iii) usability of user interface components; and (iv) spatial coverage of antennas 137a-137d as a function of pivot angle. As one example, housing assembly 102 can have a pivot mechanism that is stable in three positions: (i) fully closed; (ii) open 90°; and (iii) fully open. At least partially open position can be based on a pivot position of at least 45° that corresponds to activating a front display device in preparation for viewing at 90° or fully open. As another example, certain pivot positions affect ability of communication device 100 to communicate in certain spatial directions. detecting one or more positions of housing 102 can be used to select antennas 137a-137d for spatial diversity. Two or more at least partially open positions of housing assembly 102 can be detected for triggering changes in an operational mode of communication device 100a, such as changing a use of display devices 127 (FIG. 1). For clarity, eight (8) positions 201-208 for four (4) antennas 137a-137d (FIG. 1) are described. In one or more embodiments, fewer or more antenna positions can be provided for use with fewer or more antennas. In FIG. 2C, housing assembly 102 is in a fully open position with substantially 180° rotation between first and second housing portions 103a-103b.

Figure 3A:
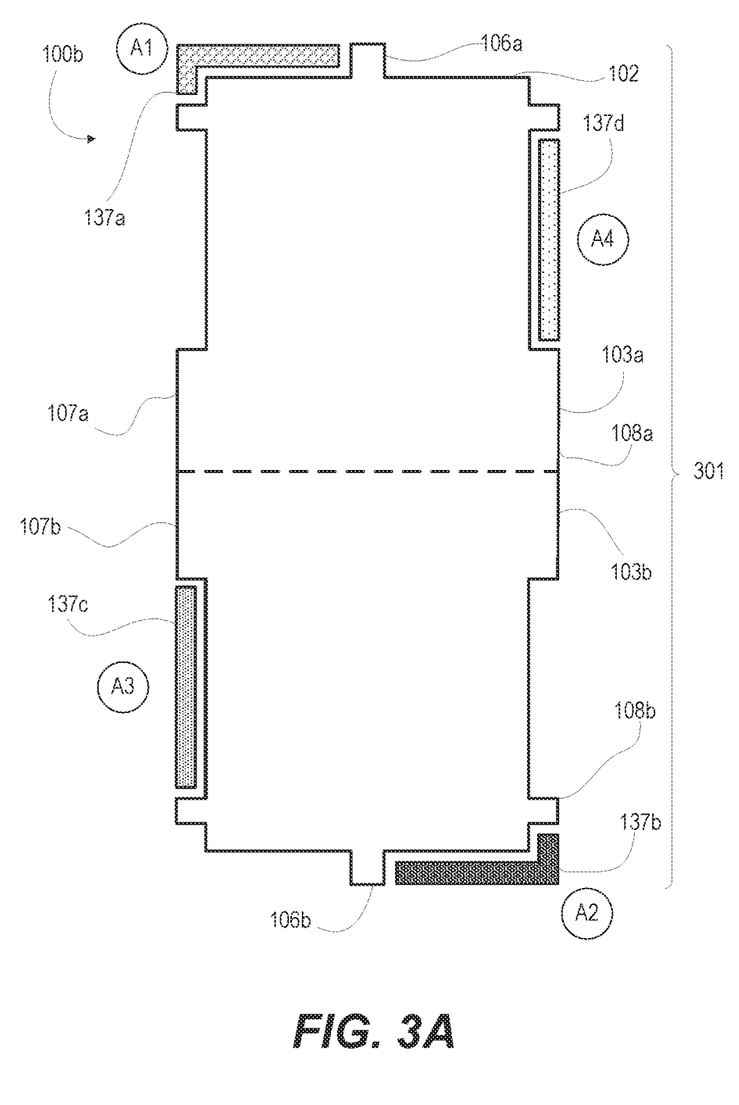
FIG. 3A depicts a front view of an example communication device having a first antenna arrangement supported by the configurable housing assembly in the open position, according to one or more embodiments.
Figure 3B:
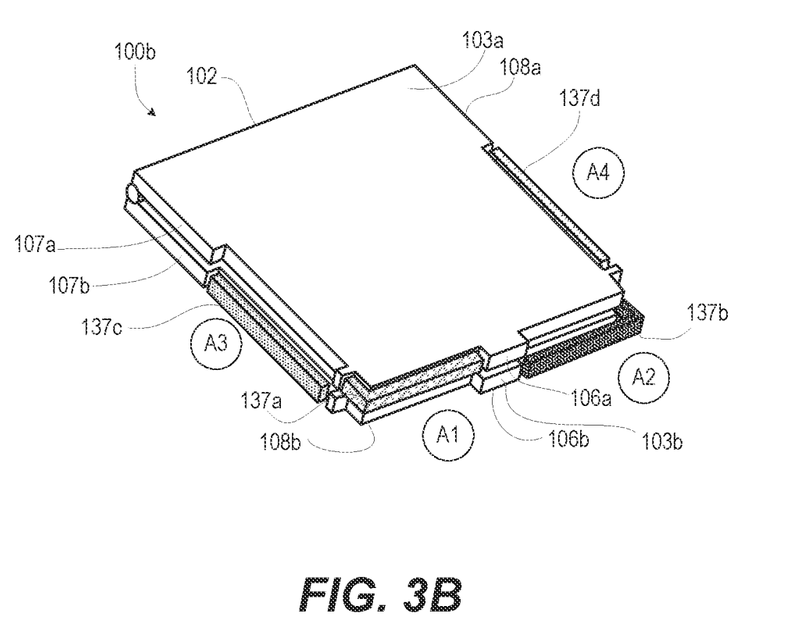
FIG. 3B depicts a three-dimensional view of the example communication device of FIG. 3A having a modified antenna arrangement while the configurable housing assembly is in the closed position, according to one or more embodiments.

FIG. 3A depicts a front view of example communication device 100b having first antenna arrangement 301 supported by configurable housing assembly 102 that is in the open position. Communication device 100b can have similar or identical components and functionality of communication device 100 (FIG. 1). FIG. 3B depicts a three-dimensional view of example communication device 100b having configurable housing assembly 102 in the closed position. In FIGS. 3A-3B, first antenna 137a is positioned at distal side 106a of first housing portion 102a. First antenna 137a is positioned in a first lateral direction from a central longitudinal axis and proximate to first lateral side 107a of first housing portion 103a. As depicted, the first lateral direction is to the left and a second lateral direction is to the right. In one or more alternate embodiments, the first lateral direction is to the right and the second lateral direction is to the left. Second antenna 137b is positioned at distal side 106b of second housing portion 103b. Second antenna 137b is positioned in the second lateral direction from the central longitudinal axis and proximate to second lateral side 108b of second housing portion 103b. Third antenna 137c is positioned at first lateral side 107b of second housing portion 103b. Fourth antenna 137d is positioned at second lateral side 108a of first housing portion 103a. First, second, third, and fourth antennas 173a-137d each have an elongated shape and are positioned to be separate from each other when housing assembly 102 is in the closed position.

Figure 4:
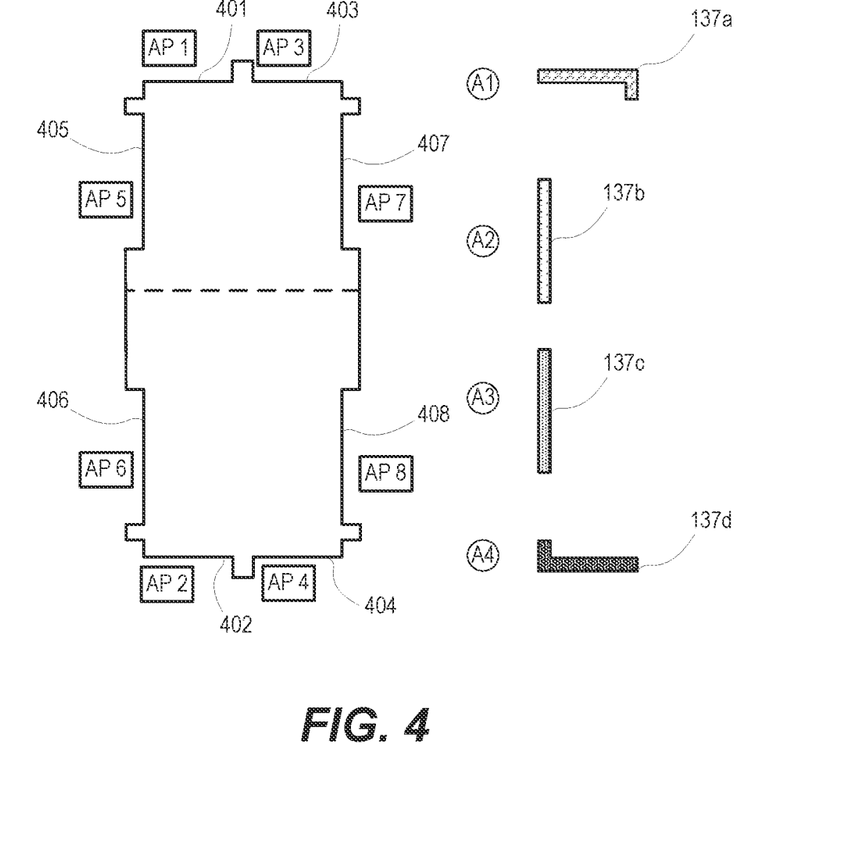
FIG. 4 depicts a front disassembled view of the example communication device of FIG. 3A having four (4) antennas positionable in four (4) of eight (8) possible antenna positions, according to one or more embodiments.

FIG. 4 depicts a front disassembled view of example communication device 100b having eight (8) possible antenna positions 401-408 for placement of four (4) antennas 137a-137d. While housing assembly 102 is in the closed position, the following four pairs of proximate and parallelly aligned antenna positions 401-408 are presented: (i) top left antenna position 401 of upper first housing portion 103a and bottom left antenna position 402 of lower second housing portion 103b; (ii) top right antenna position 403 of upper first housing portion 103a and bottom right antenna position 404 of lower second housing portion 103b; (iii) left antenna position 405 of upper first housing portion 103a and left antenna position 406 of lower second housing portion 103b; and (iv) right antenna position 407 of upper first housing portion 103a and right antenna position 408 of lower second housing portion 103b. According to one aspect of the disclosure, antenna separation is maintained while housing assembly 102 is in the closed position by positioning only one antenna (137a-137d) in each respective paired antenna positions (401-408).

TABLE 1 lists possible antenna position combinations of antennas 137a-137d (antenna "1", "2", "3", "4") in antenna positions (AP) 401-408 (AP "1", "2", "3", "4", "5", "6", "7", "8") for example communication device 100b of FIG. 4:

TABLE 1

| Combination | Pair 1 | | Pair 2 | | Pair 3 | | Pair 4 | |
|---|---|---|---|---|---|---|---|---|
| No. | AP 1 | AP 2 | AP 3 | AP 4 | AP 5 | AP 6 | AP 7 | AP 8 |
| 1 | 1 | | 2 | | 3 | | 4 | |
| 2 | 1 | | 2 | | 3 | | | 4 |
| 3 | 1 | | 2 | | | 3 | 4 | |
| 4 | 1 | | | 2 | 3 | | 4 | |
| 5 | | 1 | 2 | | 3 | | 4 | |
| 6 | 1 | | 2 | | | 3 | | 4 |
| 7 | 1 | | | 2 | 3 | | | 4 |
| 8 | | 1 | 2 | | 3 | | | 4 |
| 9 | 1 | | | 2 | | 3 | 4 | |
| 10 | | 1 | 2 | | | 3 | 4 | |
| 11 | | 1 | | 2 | 3 | | 4 | |
| 12 | | 1 | | 2 | | 3 | 4 | |
| 13 | | 1 | | 2 | 3 | | | 4 |
| 14 | | 1 | 2 | | | 3 | | 4 |
| 15 | 1 | | | 2 | | 3 | | 4 |
| 16 | | 1 | | 2 | | 3 | | 4 |

In the above table, the antenna combinations of row 9 correspond to communication device 100b of FIG. 3A. With this configuration of antennas, first antenna 137a is in AP "1" 401, second antenna 137b is in AP "4" 404, third antenna 137c is in AP "6" 406, and fourth antenna 137d is in AP "7" 407. The sixteen (16) listed combinations are the possible permutations of putting one antenna in each and every one of four pairs of antennas positions 401-408.

Figure 5:
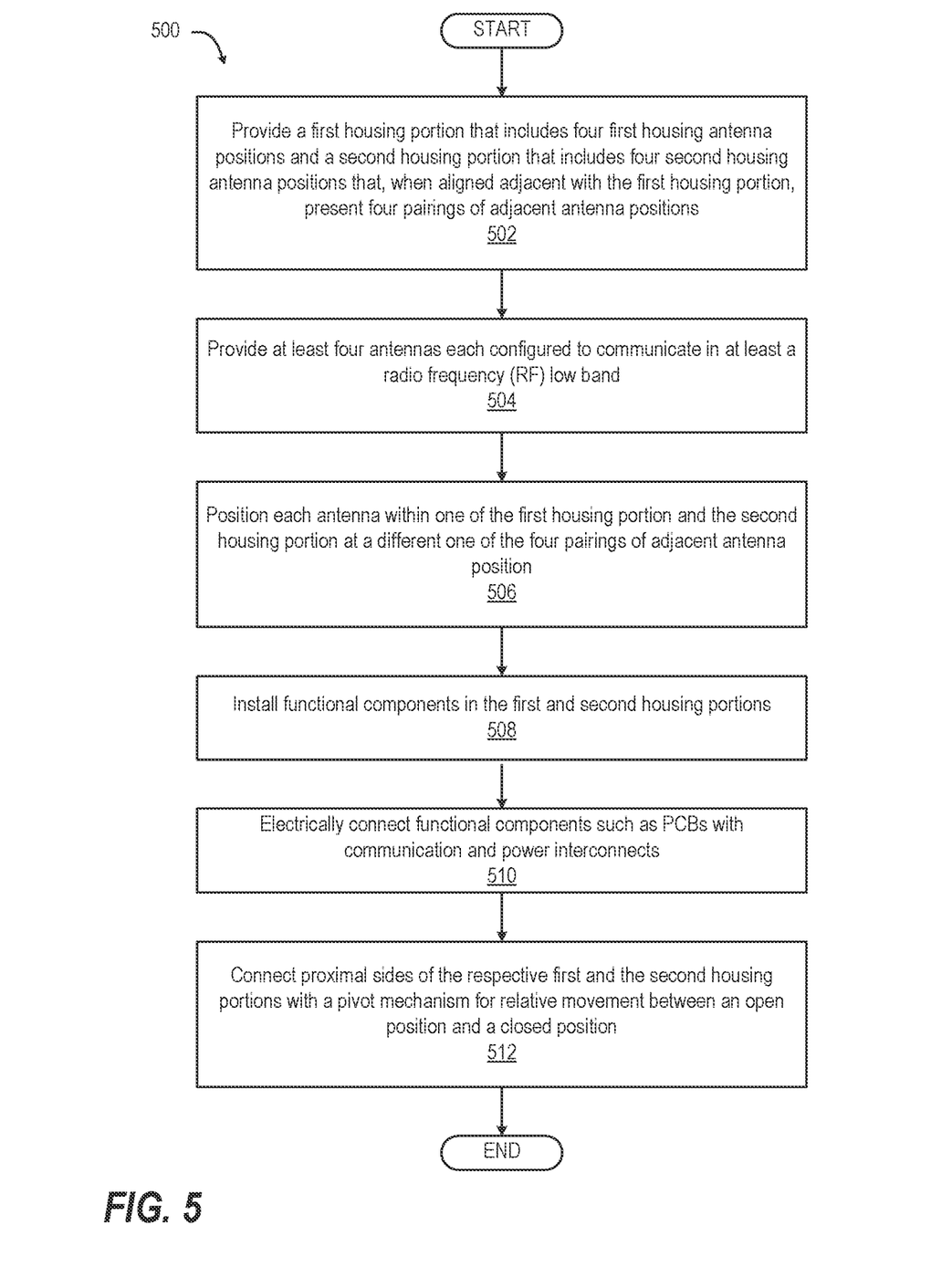
FIG. 5 presents a flow diagram of a method for making a communication device having four (4) antennas arranged within a configurable housing assembly to prevent antenna-to-antenna signal cancellation during low band (LB) transmission when the housing assembly is in a closed position, according to one or more embodiments.

FIG. 5 presents a flow diagram of method 500 for making a communication device having multiple antennas arranged within a configurable housing assembly. In particular, the antennas are arranged to communicate without antenna-to-antenna signal cancellation in RF low band while a housing assembly is in either of the open position and the closed position. The description of method 500 is provided with general reference to the specific components illustrated within the preceding FIGS. 1, 2A-2C, 3A-3B, and 4. An automated manufacturing system can manufacture and assemble the communication device. Specific components described in method 500 can be identical or similar to components of the same name used to describe preceding FIGS. 1, 2A-2C, 3A-3B, and 4. Method 500 includes providing a first housing portion that includes four first housing antenna positions and a second housing portion that includes four second housing antenna positions that, when aligned adjacent with the first housing portion, present four pairings of adjacent antenna positions (block 502). Method 500 includes providing four antennas each configured to communicate in at least a radio frequency (RF) low band (block 504). In one or more embodiments, each of the four antennas are configured to communicate in ultra-low band (ULB), low band (LB), mid-band (MB), high band (HB), and ultra-high band (UHB). Method 500 includes positioning each antenna within one of the first housing portion and the second housing portion at a different one of the four pairings of adjacent antenna position (block 506). This positioning prevents antenna-to-antenna signal cancellations while the housing assembly is in either of the at least partially open position and the closed position. Method 500 includes installing functional components in the first and second housing portions (block 508). Method 500 includes electrically connecting functional components such as PCBs with communication and power interconnects (block 510). The interacting can be between functional components installed respectively in either of the first and the second housing portions. Method 500 includes connecting respective proximal sides of the first and the second housing portions with a pivot mechanism for relative movement between an open position and a closed position (block 512). The pivot mechanism aligns four upper antenna positions on the first housing portion paired respectively with four antenna positions on the second housing portion. Then method 500 ends.

Figure 6:
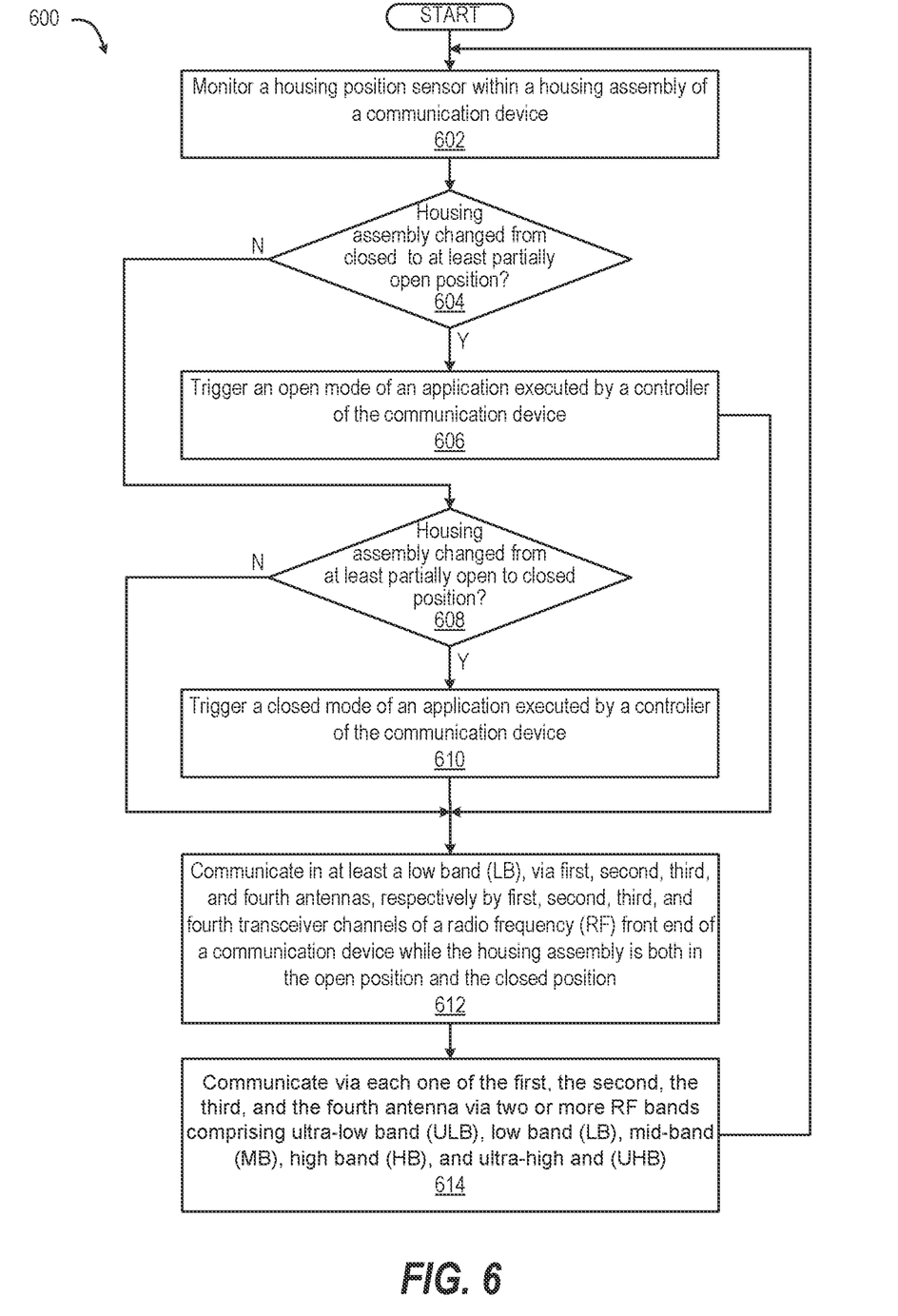
FIG. 6 presents a flow diagram of a method for enabling multiple transceiver communication channels in a communication device having multiple antennas arranged within a configurable housing assembly, according to one or more embodiments.

FIG. 6 presents a flow diagram of method 600 for enabling multiple transceiver communication in a communication device having multiple antennas arranged within a configurable housing assembly. In one or more embodiments, method 600 is enabled by providing arrangement of antennas that can provide four transceiver chains in either of the open and closed positions. The description of method 600 is provided with general reference to the specific components illustrated within the preceding FIGS. 1, 2A-2C, 3A-3B, and 4-5. In at least one embodiment, communication device 100, managed by controller 101, executes antenna control application 115 (FIG. 1) to provide the multiple transceiver communication functionality of method 600. Specific components described in method 600 can be identical or similar to components of the same name used to describe preceding FIGS. 1, 2A-2C, 3A-3B, and 4-5.

Method 600 includes monitoring a housing position sensor within a housing assembly of a communication device (block 602). The housing position sensor detects: (i) when the housing assembly is in a closed position; and (ii) when the housing assembly is in an at least partially open position. Method 600 includes determining whether the housing system has changed from a closed position to an at least partially open position (decision block 604). In response to determining that the housing system has changed from the closed position to the at least partially open position, method 600 includes triggering an open mode (of operation) of an application executed by a controller of the communication device (block 606). For example, during open mode operation, a portion of a user display device can be exposed in the at least partially open device. The controller can activate the applications user interface on the exposed display device. When the housing system has not changed from the closed position to the at least partially open position, method 600 includes determining whether the housing system has changed from the at least partially open position to the closed position (decision block 608). In response to determining that the housing system has changed from the at least partially open position to the closed position, method 600 includes triggering a closed mode (or operation) of an application executed by a controller of the communication device (block 610). For example, in the closed mode operation, the controller can use a small back display that is exposed in either of open and closed positions to present information to the user and deactivate a front display device that is hidden in the closed position to conserve power.

While certain functionalities of the communication device are responsive to the position of the housing assembly, RF communication functionality can remain fully available without reconfiguring for the position of the housing assembly. When the housing system has not changed from the at least partially open position to the closed position or after block 606 or block 610, method 600 includes communicating in at least a low band (LB), via first, second, third, and fourth antennas, respectively by first, second, third, and fourth transceiver channels of a radio frequency (RF) front end of a communication device while the housing assembly is either in the open position and the closed position (block 612). In one or more embodiments, method 600 includes communicating via each one of the first, the second, the third, and the fourth antenna via two or more RF bands comprising ultra-low band (ULB), low band (LB), mid-band (MB), high band (HB), and ultra-high and (UHB) (block 614). The multi-band communication occurs without antenna-to-antenna signal cancellation in RF low band while the housing assembly is in either the at least partially open position or the closed position. Then, method 600 returns to block 602. The antenna arrangement avoids antenna signal cancelation that occurs in the ULB and LB due to the relatively long wavelengths and less directional characteristic as compared to MB, HB, and UHB.

In one or more embodiments, method 600 includes communicating via each one of the first, the second, the third, and the fourth antennas using two different radio access technologies (RATs) for dual connectivity. Method 600 can include communicating via each one of the first, the second, the third, and the fourth antennas in support of transmission diversity. Method 600 can include communicating via each one of the first, the second, the third, and the fourth antennas in support of carrier aggregation. Method 600 can include communicating via each one of the first, the second, the third, and the fourth antennas for Evolved-Universal Terrestrial Radio Access-New Radio Dual Connectivity (EN-DC). The antenna arrangement supports each of these communication modes without antenna-to-antenna signal cancellation in RF low band, including ULB, while the housing assembly is in either the at least partially open position or the closed position.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
    a housing assembly comprising:
        a first housing portion and a second housing portion each respectively having a distal side opposite to proximal side and a first lateral side and a second lateral side extending between the respective proximal side and the distal side;
        a pivot mechanism connected between respective proximal sides of the first and the second housing portions for relative movement of the housing assembly between an open position and a closed position, the closed position aligning each of four first housing antenna positions in the first housing portion adjacent to one of four second housing antenna positions in the second housing portion to present four pairings of adjacent antenna positions; and
        four antennas each configured to communicate in at least a radio frequency (RF) low band, each antenna positioned within one of the first housing portion and the second housing portion at a different one of the four pairings of adjacent antenna positions to prevent antenna-to-antenna signal cancelations; and
    a radio frequency (RF) front end communicatively coupled to the four antennas and having two or more transceivers that utilize the four antennas to communicate without antenna-to-antenna signal cancellation in RF low band while the housing assembly is in either the open position or the closed position.

2. The communication device of claim 1, wherein:
    the four antennas comprise a first, a second, a third, and a fourth antenna;
    the four first antenna positions comprise a first, a third, a fifth, and a seventh antenna position that are positioned respectively on: (i) the first lateral side; (ii) a first lateral section of the distal side; (iii) a second lateral section of the distal side; and (iv) the second lateral side of the first housing portion;
    the four second antenna positions on the second housing portion comprise a second, a fourth, a sixth, and an eighth position that are positioned respectively on: (i) the first lateral side; (ii) a first lateral section of the distal side; (iii) a second lateral section of the distal side; and (iv) the second lateral side of the second housing portion; and
    the pairings of adjacent antenna positions comprise: (i) a first pair consisting of the first and the second antenna positions that receive the first antenna; (ii) a second pair consisting of the third and the fourth antenna positions that receive the second antenna; (iii) a third pair consisting of the fifth and the sixth antenna positions that receive the third antenna; and (iv) a fourth pair consisting of the seventh and the eighth antenna positions that receive the fourth antenna.

3. The communication device of claim 2, wherein:
    the first antenna is positioned at the first antenna position;
    the second antenna is positioned at the fourth antenna position;
    the third antenna is positioned at the sixth antenna position; and
    the fourth antenna is positioned at the seventh antenna position.

4. The communication device of claim 1, wherein each of the four antennas are configured to communicate at least one of in ultra-low band (ULB), low band (LB), mid-band (MB), high band (HB), and ultra-high band (UHB) while the housing assembly is in either the at least partially open position or the closed position.

5. The communication device of claim 1, wherein the RF front end is configured to independently use the first, second, third, and fourth antennas in support of multiple transceiver communication channels using two different radio access technologies (RATs) for dual connectivity while the housing assembly is in either of the at least partially open position and the closed position.

6. The communication device of claim 1, wherein the RF front end is configured to independently use the first, second, third, and fourth antennas in support of transmission diversity while the housing assembly is in either of the at least partially open position and the closed position.

7. The communication device of claim 1, wherein the RF front end is configured to independently use the first, second, third, and fourth antennas in support of carrier aggregation while the housing assembly is in either of the at least partially open position and the closed position.

8. The communication device of claim 1, wherein the RF front end is configured to independently use the first, second, third, and fourth antennas in support for Evolved-Universal Terrestrial Radio Access-New Radio Dual Connectivity (EN-DC) while the housing assembly is in either of the at least partially open position and the closed position.

9. A method comprising:
    providing a housing assembly having first housing portion and a second housing portion each having a distal side opposite to a proximal side and a first lateral side and a second lateral side extending between the respective proximal side and the distal side, the first housing portion including four first housing antenna positions, the second housing portion including four second housing antenna positions that, when the housing assembly is in a closed position, the four second housing antenna positions are aligned adjacent to the four first housing antenna positions, presenting four pairings of adjacent antenna positions;
providing four antennas each configured to communicate in at least a radio frequency (RF) low band;
positioning each antenna within one of the first housing portion and the second housing portion at a different one of the four pairings of adjacent antenna positions to prevent antenna-to-antenna signal cancellations; and
connecting respective proximal sides of the first and the second housing portions with a pivot mechanism for relative movement between an open position and a closed position that aligns four upper antenna positions on the first housing portion paired respectively with four antenna positions on the second housing portion.

10. The method of claim 9, wherein:
the four antennas comprise a first, a second, a third, and a fourth antenna;
the four first antenna positions comprise a first, a third, a fifth, and a seventh antenna position that are positioned respectively on: (i) the first lateral side; (ii) a first lateral section of the distal side; (iii) a second lateral section of the distal side; and (iv) the second lateral side of the first housing portion;
the four second antenna positions on the second housing portion comprise a second, a fourth, a sixth, and an eighth position that are positioned respectively on: (i) the first lateral side; (ii) a first lateral section of the distal side; (iii) a second lateral section of the distal side; and (iv) the second lateral side of the second housing portion; and
the pairings of the adjacent positions comprise: (i) a first pair consisting of the first and the second antenna positions that receive the first antenna; (ii) a second pair consisting of the third and the fourth antenna positions that receive the second antenna; (iii) a third pair consisting of the fifth and the sixth antenna positions that receive the third antenna; and (iv) a fourth pair consisting of the seventh and the eighth antenna positions that receive the fourth antenna.

11. The method of claim 10, wherein positioning each antenna within one of the first housing portion or the second housing portion at the different one of the four pairings of adjacent antenna positions comprises:
positioning the first antenna at the first antenna position;
positioning the second antenna at the fourth antenna position;
positioning the third antenna at the sixth antenna position; and
positioning the fourth antenna at the seventh antenna position.

12. The method of claim 11, wherein each of the four antennas are configured to communicate in at least one of ultra-low band (ULB), low band (LB), mid-band (MB), high band (HB), and ultra-high band (UHB) while the housing assembly is in either of the at least partially open position and the closed position.

13. A method comprising:
monitoring a housing position sensor within a housing assembly of a communication device and that detects: (i) when the housing assembly is in a closed position; and (ii) when the housing assembly is in an at least partially open position, the housing assembly having first and second housing portions connected at respective proximal sides for relative movement of the housing assembly between an open position and the closed position that aligns each of four first antenna positions in the first housing portion adjacent to one of four second antenna positions in the second housing portion to present four pairings of adjacent antenna positions, the first housing portion and the second housing portion each having a distal side opposite to a proximal side and a first lateral side and a second lateral side extending between the proximal sides and the distal sides,
triggering an application executed by a controller of the communication device in response determining that the housing assembly has changed from a closed position to an at least partially open position; and
communicating in at least a low band (LB), via first, second, third, and fourth antennas, respectively by first, second, third and fourth transceiver channels of a radio frequency (RF) front end of a communication device while the housing assembly is in either of the open position and the closed position;
wherein each of the first, the second, the third, and the fourth antenna are positioned at a respective pair of the upper and the lower antenna positions within one of the first housing portion or the second housing portion to communicate without antenna-to-antenna signal cancellation in RF low band while the housing assembly is in either of the open position and the closed position.

14. The method of claim 13, further comprising communicating via each one of the first, the second, the third, and the fourth antenna via two or more RF bands comprising ultra-low band (ULB), low band (LB), mid-band (MB), high band (HB), and ultra-high and (UHB) without antenna-to-antenna signal cancellation in RF low band while the housing assembly is in either of the at least partially open position and the closed position.

15. The method of claim 13, further comprising communicating via each one of the first, the second, the third, and the fourth antenna using two different radio access technologies (RATs) for dual connectivity without antenna-to-antenna signal cancellation in RF low band while the housing assembly is in either of the at least partially open position and the closed position.

16. The method of claim 13, further comprising communicating via each one of the first, the second, the third, and the fourth antenna in support of transmission diversity without antenna-to-antenna signal cancellation in RF low band while the housing assembly is in either of the at least partially open position and the closed position.

17. The method of claim 13, further comprising communicating via each one of the first, the second, the third, and the fourth antenna in support of carrier aggregation without antenna-to-antenna signal cancellation in RF low band while the housing assembly is in either of the at least partially open position and the closed position.

18. The method of claim 13, further comprising communicating via each one of the first, the second, the third, and the fourth antenna for Evolved-Universal Terrestrial Radio Access-New Radio Dual Connectivity (EN-DC) without antenna-to-antenna signal cancellation in RF low band while the housing assembly is in either of the at least partially open position and the closed position.

* * * * *